(12) United States Patent
Gaj et al.

(10) Patent No.: US 10,981,804 B2
(45) Date of Patent: Apr. 20, 2021

(54) HYDRAULIC CONTROL AND TREATMENT DEVICE, PARTICULARLY FOR HYDRAULIC APPARATUSES OR SYSTEMS

(71) Applicant: ELTEK S.P.A., Casale Monferrato (IT)

(72) Inventors: Renato Gaj, Casale Monferrato (IT); Luciano Bianchi, Rosignano Monferrato (IT); Fiorenzo Pivetta, Casale Monferrato (IT); Costanzo Gadini, Frassineto (IT)

(73) Assignee: ELTEK S.P.A., Casale Monferrato (IT)

(*) Notice: Subject to any disclaimer, the term of this patent is extended or adjusted under 35 U.S.C. 154(b) by 117 days.

(21) Appl. No.: 15/758,656

(22) PCT Filed: Aug. 25, 2016

(86) PCT No.: PCT/IB2016/055074
§ 371 (c)(1),
(2) Date: Mar. 8, 2018

(87) PCT Pub. No.: WO2017/042656
PCT Pub. Date: Mar. 16, 2017

(65) Prior Publication Data
US 2018/0273399 A1 Sep. 27, 2018

(30) Foreign Application Priority Data
Sep. 10, 2015 (IT) .................. 102015000050505

(51) Int. Cl.
| | | |
|---|---|---|
| C02F 1/00 | (2006.01) |
| D06F 39/08 | (2006.01) |
| C02F 1/48 | (2006.01) |
| C02F 1/28 | (2006.01) |
| F16K 21/16 | (2006.01) |

(Continued)

(52) U.S. Cl.
CPC .............. *C02F 1/008* (2013.01); *C02F 1/283* (2013.01); *C02F 1/481* (2013.01); *C02F 1/50* (2013.01);

(Continued)

(58) Field of Classification Search
CPC .......... C02F 1/008; C02F 1/283; C02F 1/481; C02F 1/50; C02F 1/505; C02F 2201/005;
(Continued)

(56) References Cited

U.S. PATENT DOCUMENTS 4,023,708 A * 5/1977 Fornasari .............. D06F 39/081
222/20
5,178,757 A * 1/1993 Corney ................... C02F 1/481
210/222

(Continued)

FOREIGN PATENT DOCUMENTS

DE      19857730 A1 *  7/1999   .............. C02F 1/48
DE      101 00 163 A1   7/2002
(Continued)

OTHER PUBLICATIONS

Machine English Translation of EP1134192A1 from EPO website (Year: 2001).*
(Continued)

*Primary Examiner* — Terry K Cecil
(74) *Attorney, Agent, or Firm* — Workman Nydegger

(57) ABSTRACT

A hydraulic control and/or safety device, particularly for utility apparatuses or systems or appliances, which is preferably able to carry out a flow shut-off and/or limitation, particularly in the event of fault of the utility apparatus or system or appliance, and/or one or more features that improve the device and/or the apparatus performance. In particular, the device can carry out the function of the fluid treatment, so as to be particularly reliable, as it prevents at least the formation of deposits on its mechanical components designed to limit the water flow.

29 Claims, 12 Drawing Sheets

(51) Int. Cl.
*C02F 1/50* (2006.01)
*D06F 39/00* (2020.01)

(52) U.S. Cl.
CPC ............ *C02F 1/505* (2013.01); *D06F 39/081* (2013.01); *F16K 21/16* (2013.01); *C02F 2201/005* (2013.01); *C02F 2201/006* (2013.01); *C02F 2209/40* (2013.01); *C02F 2301/022* (2013.01); *C02F 2303/04* (2013.01); *C02F 2303/14* (2013.01); *C02F 2303/20* (2013.01); *C02F 2303/22* (2013.01); *C02F 2307/06* (2013.01); *C02F 2307/12* (2013.01); *D06F 39/007* (2013.01)

(58) Field of Classification Search
CPC ............ C02F 2201/006; C02F 2209/40; C02F 2301/022; C02F 2303/04; C02F 2303/14; C02F 2303/22; C02F 2307/06; C02F 2307/12; C02F 2303/20; D06F 39/007; D06F 39/081; A47L 15/421; A47L 15/4212; F16K 21/16
See application file for complete search history.

(56) References Cited

U.S. PATENT DOCUMENTS

| | | | |
|---|---|---|---|
| 7,353,844 B2* | 4/2008 | Da Pont | ............... A47L 15/421 137/613 |
| 10,618,828 B2* | 4/2020 | Vo | ........................ C02F 1/482 |
| 2004/0025263 A1 | 2/2004 | Kim et al. | |
| 2009/0065352 A1 | 3/2009 | Kitsuka et al. | |
| 2009/0236374 A1* | 9/2009 | Pardes | ................. A61F 9/0008 222/494 |

FOREIGN PATENT DOCUMENTS

| | | | | |
|---|---|---|---|---|
| EP | 1134192 A1 * | 9/2001 | ............. | C02F 1/481 |
| GB | 809685 A | 3/1959 | | |
| WO | 2013/161336 A1 | 10/2013 | | |

OTHER PUBLICATIONS

International Search Report dated Nov. 7, 2016, issued in PCT Application No. PCT/IB2016/055074, filed Aug. 25, 2016.

* cited by examiner

HYDRAULIC CONTROL AND TREATMENT DEVICE, PARTICULARLY FOR HYDRAULIC APPARATUSES OR SYSTEMS

BACKGROUND OF THE INVENTION

1. The Field of the Invention

From a general point of view, the present invention relates to a hydraulic control and/or safety device, preferably of the type adapted to shut off and/or limit the volume and/or amount of a fluid, in particular towards a utility apparatus, preferably but not exclusively a household appliance such as washing machines, dishwashers and the like, or to a utility system, such as thermo-sanitary or heating systems and/or water treating systems and/or irrigation systems; in particular, said device is associated with or comprises fluid treating means.

2. The Relevant Technology

As is known, in order to prevent the risk of room flooding in the event of a malfunction or fault of a washing machine which does not allow stopping the water flow from the water mains, safety devices are applied on the pipe connecting the latter to the appliance, which essentially are relief valves also known as water blocks.

In practice, the known devices allow measuring the water flow that continuously flows from the water mains to the appliance and they interrupt the flow by closing the pipe with a valve, when an amount of water higher than a preset limit is reached; to this end, certain safety devices are provided with adjustment means which allow setting their operation according to the criteria selected by the user.

Thus, for example, if a safety device is calibrated for a closing limit at 50 liters, it interrupts the passage of water in the appliance supply pipe when this amount is reached without interruption of the flow, since this means that the appliance does not work properly and therefore there is a risk of flooding if water from the water mains is still fed.

In contrast, when the appliance is working properly, water is supplied at successive intervals, for example for a load washing cycle or rinsing cycle, reaching individual levels below the safety limit that as a whole can still go beyond it.

By way of example, let's think of a washing cycle that requires a water load equal to 30 liters: this amount is supplied continuously from the mains but once reached, the washing machine stops the inlet of more water according to the program set on the appliance; in this circumstance, the safety device detects the stop of the passage of water and resets the counting of liters supplied.

Therefore, even if later there is a new inflow of water from the mains equal to 30 liters, the safety device does not carry out any stop even if the total amount accumulated in the different loading steps of the appliance exceeds the calibration limit of the device.

Examples of safety devices working according to the above have been known for some decades, as shown by the Italian Patent No. 1119041, or the English No. 2,055,454 and French patent applications No. 2,193,164, to which reference should be made for further details about what has just been explained.

What is noted herein is that the known safety devices which have been discussed heretofore and which substantially comprise means, usually of the mechanical type, for counting the amount of liquid that passes through them and/or mechanical valve means for shutting off the flow, are also quite popular because inexpensive compared to other solutions, such as solenoid valves and flow meters or electric counters or others; however, the known safety devices, even those of a mechanical type and therefore more reliable than the electrically-controlled ones, are not exempt from risks of reliability that can jeopardize the anti-flooding function for which they are designed.

In fact, the applicant has found that like in all hydraulic apparatuses, deposits may form in the safety devices over time on the surfaces that are in contact with water or dispersed particles in suspension therein, which affect their normal operation; in particular, limestone and/or microbial or bacterial particles or deposits may form, such as deposits or aggregations of microorganisms also known as biofilms or biofouling, often comprising secretions of an adhesive matrix, such as of polymeric substances, which can also petrify or solidify.

For example, gears may have interference problems due to the presence of limestone deposits or particles or microbial substances and they could become jammed, like other members (springs, shafts, ratchets, gates, etc.) designed to shut off the fluid could lock or work irregularly; as a result, in such situations when the water flow should be stopped, the device does not work or in any case it does not as it should (e.g., operates late or partially), so as to affect the anti-flooding function for which it is intended.

This phenomenon may be accentuated in safety flow and/or anti-flooding control devices which are used occasionally, with relatively long storage times, resulting in water stagnation in the device, such as for example devices hydraulically connected to said utility apparatuses and/or systems, which may require a transit of the fluid for a short time of a few seconds or minutes against the subsequent downtime for days or months; let's consider, for example, the possible long downtime between one cycle and the next of a washing machine or a watering device or a valve for the periodic top up of water in a boiler.

This situation can be more widely felt if the safety device is applied on the hot water line of a household appliance or of any hydraulic system, for example to reduce the electric energy heating consumption thereof, or in any case in environmental conditions in which the device and/or the fluid is heated, such as for example use in heating systems or the exposure to strong sunlight.

Indeed, it is known that the formation of limestone and more generally of calcareous deposits and/or the formation of microbial colonies and/or substances, such as a biofilm or biofouling, increases with temperature: in these conditions, the risk of a fault of the hydraulic safety devices is greater.

In this context, it should be noted that the general teaching of the prior art is to use electrical water descaling apparatuses and/or disinfection devices applied directly in the appliance.

An example of this known descaling technique is found in the Spanish patent application N. 2282016, which describes household appliances such as a washing machine and a dishwasher, connected directly to the water mains via a solenoid valve connected upstream with the pipe coming from the mains tap; downstream of the solenoid valve there is an electrical water descaling system which, in the case of the Spanish application, consists of an electric winding applied on an inner pipe of the appliance.

An example of the known antibacterial technique is found in the Japanese patent application N. 2011250847, which describes a washing machine with an integrated electrical antibacterial device, with electrodes controlled by the machine, connected downstream of the water inlet valve.

As can be understood, this type of solution is not effective for hydraulic safety devices since, as it is known, they are mounted upstream of the appliance, that is, between the solenoid valve of the latter and the connection to the water mains (e.g., a tap or other).

The present applicant has instead originally thought that in order to improve the prior art, certain risks of malfunction can advantageously be eliminated or reduced and/or the performance of the safety devices referred to above can be enhanced or extended.

In fact, if the performance level for appliances as regards safety has now reached the highest standards, also due to the use of sophisticated technologies and a massive use of electronics (processors, sensors, etc.) to manage articulated and complex operating programs, however it must be considered that in case of power supply failures or anomalies, this performance is significantly reduced.

Moreover, the damage related to the presence of limescale deposits on the surfaces or in the presence of microbial substances is usually addressed in, or downstream of, the appliance, that is, during its normal operating cycle or at specific treatment steps different other than the load washing.

In this respect, think indicatively to the numerous products commercially available in the form of pellets, gels, granules, controlled-release dispensers and so on, used in washing machines and dishwashers; in some cases, these products are delivered or released when the appliance carries out the load washing and/or rinsing cycle (dishes, clothes, etc.), while in other cases the anti-limestone or disinfectants products are administered in a specific operating cycle of the appliance. These different application methods depend on various factors, such as the type of appliance (which may be or not provided with an anti-limestone or disinfectant substance dispenser), or the shape of the anti-limestone or disinfectant product (powder, liquid, pads, etc.).

Without discussing the effectiveness of these products, it is clear that by their very nature they operate on the water present in the appliance, which has therefore already been in contact with surfaces (tank, basket, electric heaters, dishes, etc.) on which deposits and/or incrustations tend to form.

Therefore, the salts or microbes present in the water have already deposited on the surfaces of the load and/or of the components of the washing machine or dishwasher (especially electric resistors and filters), thus the effectiveness of the treatment may be limited.

SUMMARY OF THE INVENTION

A technical problem underlying the present invention is to overcome the drawbacks outlined above with reference to the prior art.

A further technical problem is to make the operation of the safety device autonomously reliable independently of the appliance apparatus to which it may be associated.

Another technical problem is to provide a device that improves the quality of the fluid or water fed to the utility apparatus or system.

According to one aspect, the invention aims to improve the safety and/or reliability and/or performance of hydraulic control and/or safety and/or flow limiting devices, in particular devices and/or valves of a mechanical type or with movable mechanical parts, such as the devices associated or that can be associated with appliances, irrigation systems, thermo-health or heating systems and/or water treatment plants and/or other applications in general; in fact, as said above, the operation of these devices may be impaired by fouling and/or deposits and/or particles and/or aggregations of microorganisms or biofilms, particularly of limestone that is formed in the device.

In a further and more specific aspect, the invention aims to provide a hydraulic safety device and/or a flow limiter of the type considered above, with such structural and/or functional features as to make it adapted to carry out also other advantageous operations for the utility apparatus or the appliance.

An idea of solution to the technical problem mentioned above is to have treating means along at least part of the water path in the hydraulic safety device, which may be active on the flow that passes through them; advantageously, these treating means are preferably located upstream and/or in the proximity of the flow counting and/or control and/or shut-off means.

According to a particular idea of solution of the technical problem, the fluid treating means work in a synergistic manner with those adapted to perform the control and/or safety and/or shut off function; preferably, the treating means and/or active on the flow have an anti-limestone and/or antimicrobial function.

According to a preferred embodiment of the invention, the fluid treating means comprise permanent magnets or magnetic fields and/or antimicrobial elements located in the proximity or upstream of the mechanical parts, such as gears and/or rotary shafts and/or impellers and/or diffusers and/or narrow passages, so that such magnetic fields applied to the water flows can prevent precipitation and/or sedimentation of limestone and/or the formation of micro-organism aggregates on such mechanical parts.

To this end, it is considered that for sake of convenience of description, the term "anti-limestone" and/or "antimicrobial" alone may also be used in the text, this term however including devices adapted to remove or counteract any possible deposit or formation of organic, inorganic and/or biological type, including aggregates or deposits of micro-organisms and/or germs and/or bacteria and/or microbes and/or viruses and/or fungi.

It should also be noted that the term antimicrobial is generically used in this description and in the following claims to denote the property to eliminate or at least reduce the presence of micro-organisms that can be found in water such as bacteria, viruses, germs and others; therefore, the use of the terms "antimicrobial", "antibacterial" and the like should be understood as synonyms in a broad sense, covering a generic action against pathogenic water micro-organisms.

This is preferably obtained by providing one or more permanent magnets, in particular able to generate such a magnetic field as to prevent the formation of calcite and/or to induce a transformation into aragonite of any calcium carbonate which may be present in the water, in order to prevent the precipitation of calcite and/or in such a way that any aragonite which may have formed will remain in suspension and will easily be expelled by the flow of the water, or providing one or more antimicrobial inserts or parts of the device of antimicrobial material, such as moulded parts made of antimicrobial thermoplastic material and/or of a polymer containing microbial substances.

According to an autonomously inventive aspect, the hydraulic control and/or safety device comprises or includes parts or inserts of disinfectant or antiseptic or antimicrobial material or otherwise of a material or substance able to prevent or reduce or limit the growth of microorganisms or germs or bacteria or virus or fungi and/or the formation or deposit of substances produced by them, such as the formation of microbial colonies and/or substances and/or of "biofilms" of "biofouling", in particular in the device and/or in the utility apparatus located upstream of the device, preferably to avoid the blocking of movable parts of the device and/or damages to users' health.

Moreover, in this way the liquid that is fed to the utility apparatus or appliance passes into the device and can thus be treated or descaled or disinfected as needed, with a possible benefit for this apparatus as well, and/or for movable parts thereof; for this purpose, it should be considered that the device according to the invention treats all the liquid that circulates, so there is no dispersion of the liquid in the apparatus or appliance that makes difficult its complete treatment in a safe and effective manner, as occurs in the state of the art.

Additional purposes, features and advantages of the present invention shall be readily apparent from the detailed description that follows and the related accompanying drawings, provided purely by way of explanatory and non-limiting example.

BRIEF DESCRIPTION OF THE DRAWINGS

The features and/or purposes and/or advantages of the invention shall become more readily apparent from the description that follows and from the accompanying drawings, provided by way of indicative and non-limiting exemplifying embodiment, in which.

DETAILED DESCRIPTION OF THE PREFERRED EMBODIMENTS

Figure 1:
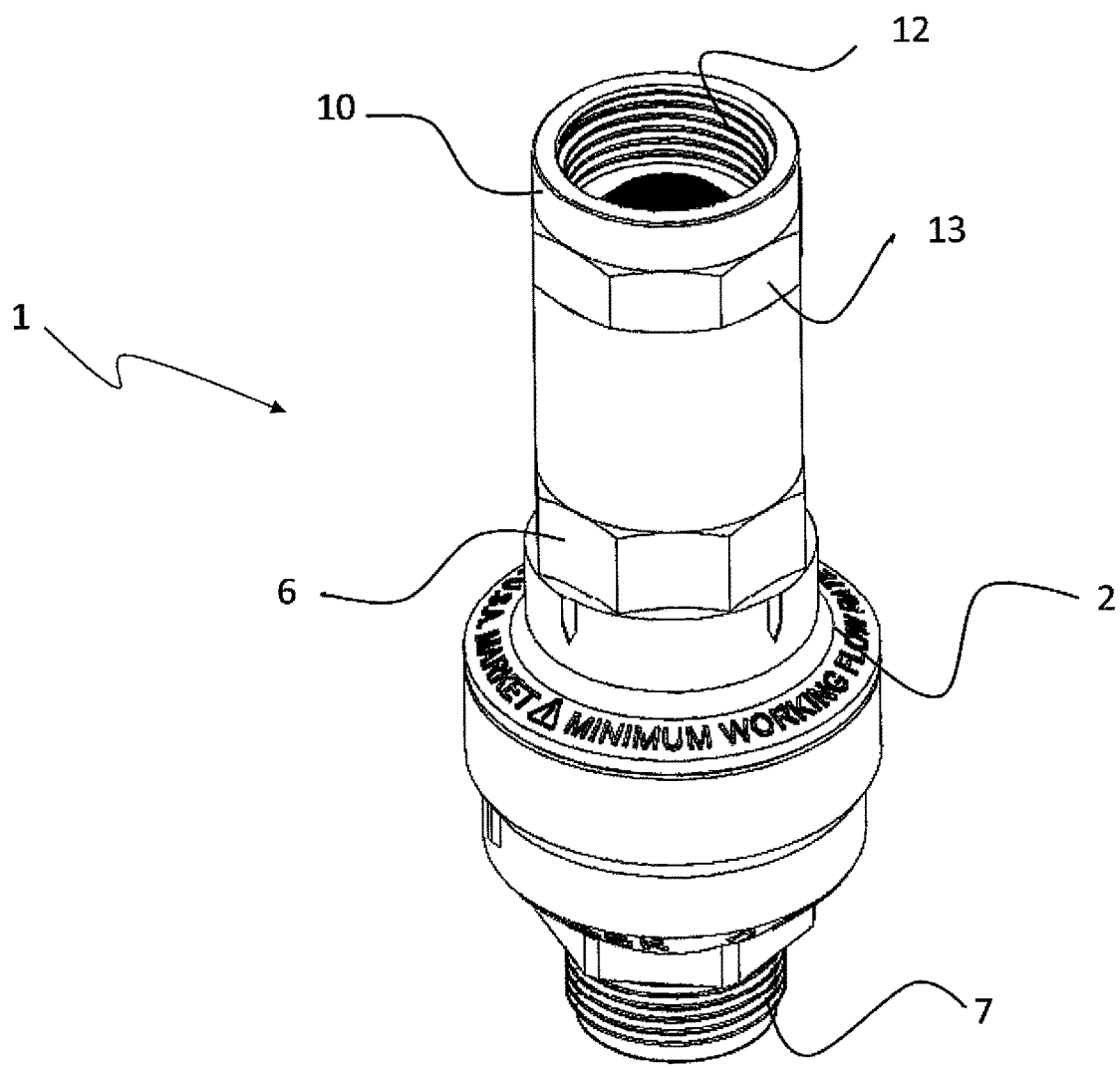
FIG. 1 shows a prospective view of a hydraulic safety device according to the invention.

Before proceeding in the detailed description, it is necessary to state that particular configurations and/or structures and/or characteristics described below with respect to the non-limiting example can be considered individually or combined in any adequate manner, in one or more embodiments, even different from the exemplified embodiments; moreover, the references used hereafter are only for the sake of convenience and do not define the scope of protection of the embodiments. Definitions like "upper", "lower", "above", "below", "top", "bottom" are referred to the exemplifying figures and are not to be construed in a limiting sense.

With reference to the drawings, in them numeral 1 indicates as a whole a device according to the invention, such as a hydraulic safety or control device provided with means for treating the fluid, which comprises an outer body or casing 2 consisting of two parts: a lower one 3 and an upper one 4, preferably connected to each other by means of a threaded coupling 5. The latter could nonetheless be of a different kind, e.g., bayonet, press-fit or the like, although the lower half-body 3 and the upper half-body 4 could be mutually fastened in a rigid manner, e.g., by means of welding or gluing.

The body 2 is preferably made of a polymer or plastic or thermoplastic material, such as polyamide reinforced with glass fibre or the like, although it is possible also to use other materials suitable for the purposes, in particular metallic materials like steel, copper, brass, aluminium, silver and others, individually or alloyed.

According to at least one possible variant of the invention, to be described below, the upper part 4 may comprise a portion or be made at least partially of a metallic material.

In addition, preferably on the upper part 4 is externally obtained a polygonal faceted portion 6, which serves for the engagement with a tightening tool such as a pincer, a spanner and the like.

The body 2 of the device is preferably applied downstream of a hydraulic connection or of a tap of a water mains and/or upstream of an appliance or a utility device or apparatus, not shown in the drawings.

For this purpose the device 1 is provided at the upper end and at the lower end respectively, with an inlet fitting 12 and an outlet fitting 7 of the water, with which it can be respectively connected upstream of said hydraulic network or member connected therewith, such as a tap and/or a pipe and/or junction, and connected downstream to the supply pipe of the appliance or utility system (not shown in the drawings).

In this case the inlet fitting 12 and the outlet fitting 7 consist of threads, but other solutions may be provided in their place, such as bayonet fittings, ring nuts, or yet others.

According to the preferential example, the upper portion of body 4 comprises or is associated with an insert 10, preferably able to house at least part of the treating means 21 and which shall be described more thoroughly hereafter, whilst it is best here to concentrate on the means of the device 1 relating to the hydraulic safety or control that are housed at least in part in the lower half body 3 and/or at least in part in the upper body 4.

Starting from the top with reference to the drawings, the safety and/or control means comprise a first shutter 30 mounted at the upper end of a shaft 31 supported idle within the body 2 of the device, whose lower end is engaged with a helical spring 32.

Figure 2:
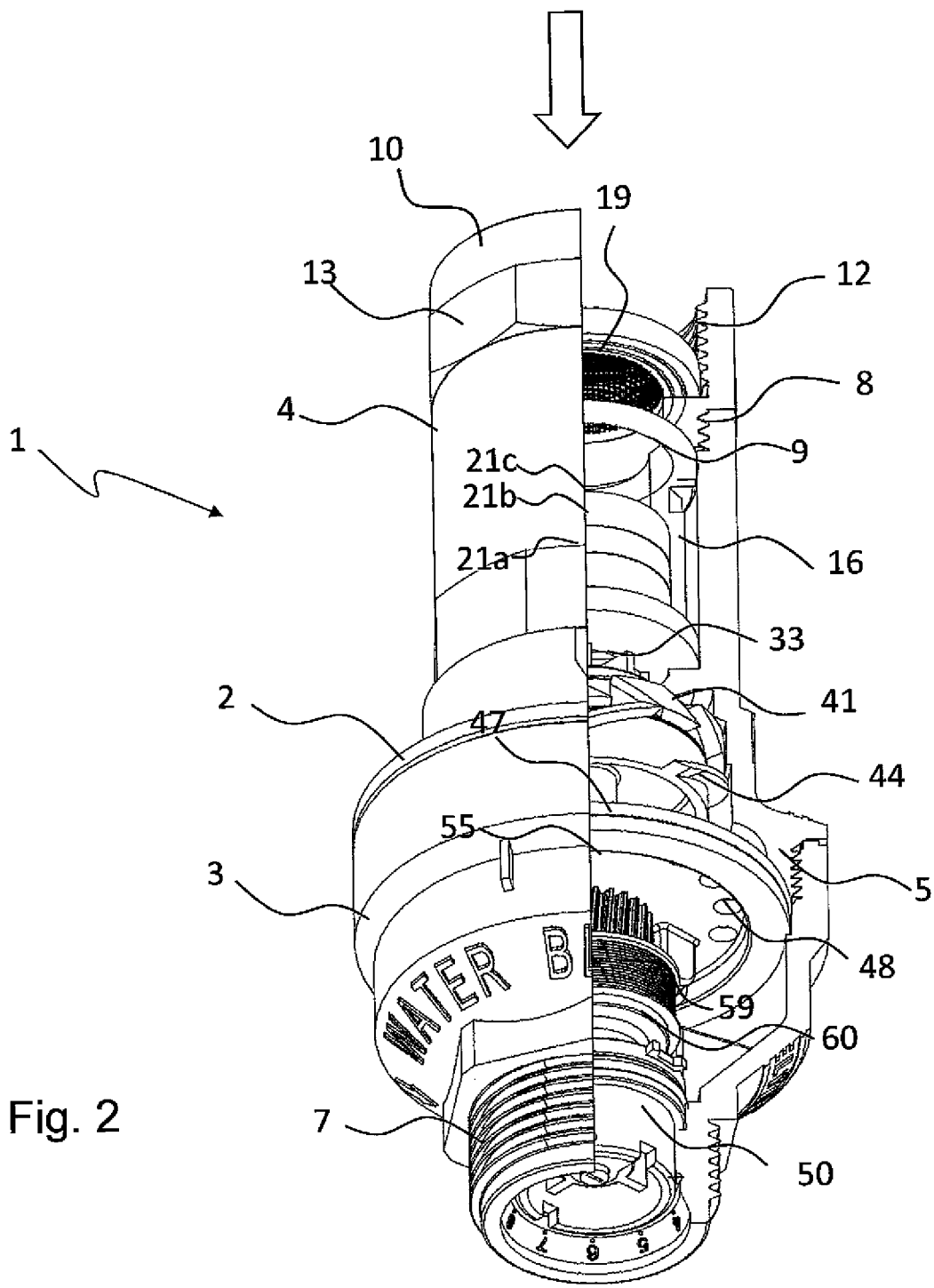
FIG. 2 is an axonometric view with a part removed, of the device of FIG. 1.
Figure 3:
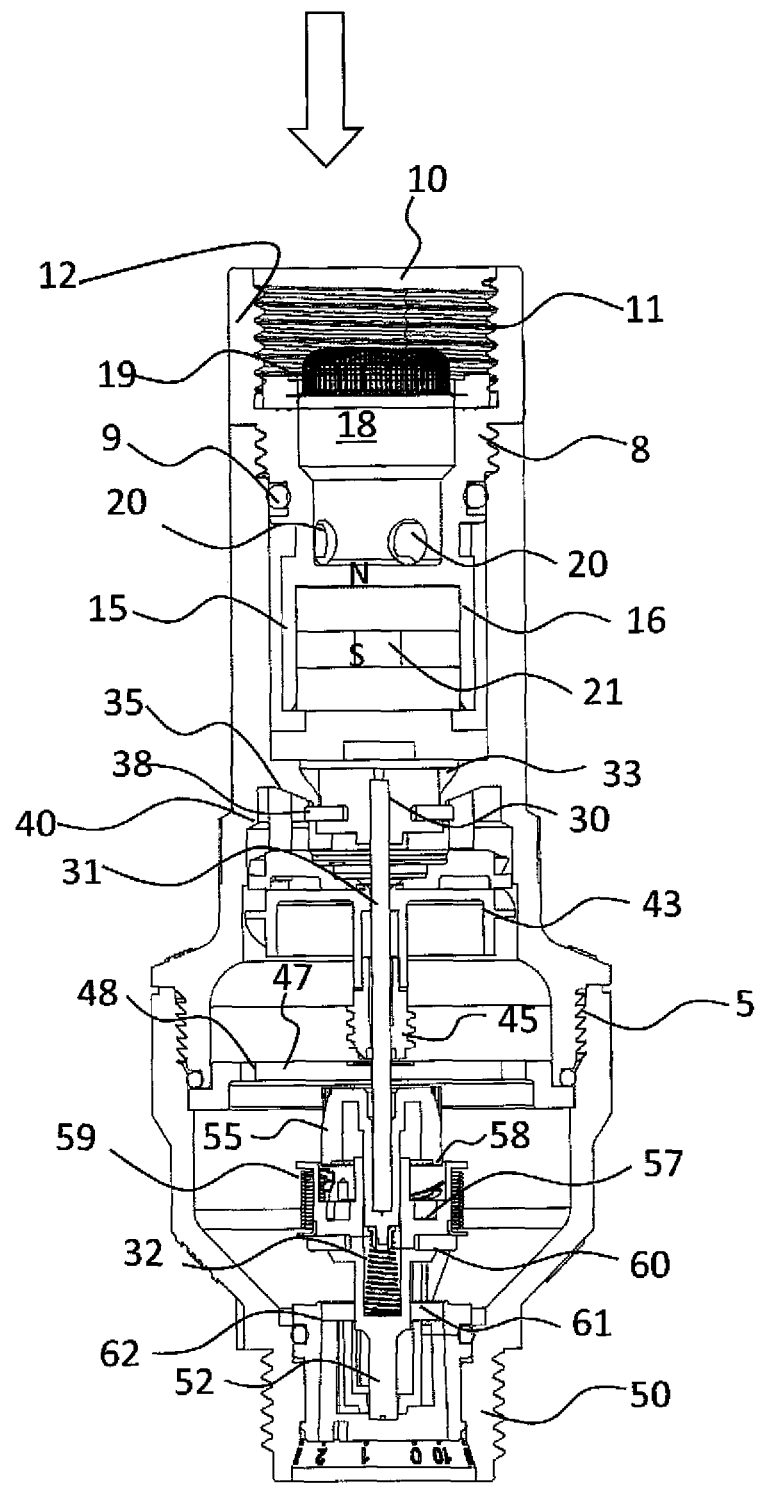
FIG. 3 is a longitudinal section view of the device of FIG. 1.
Figure 4:
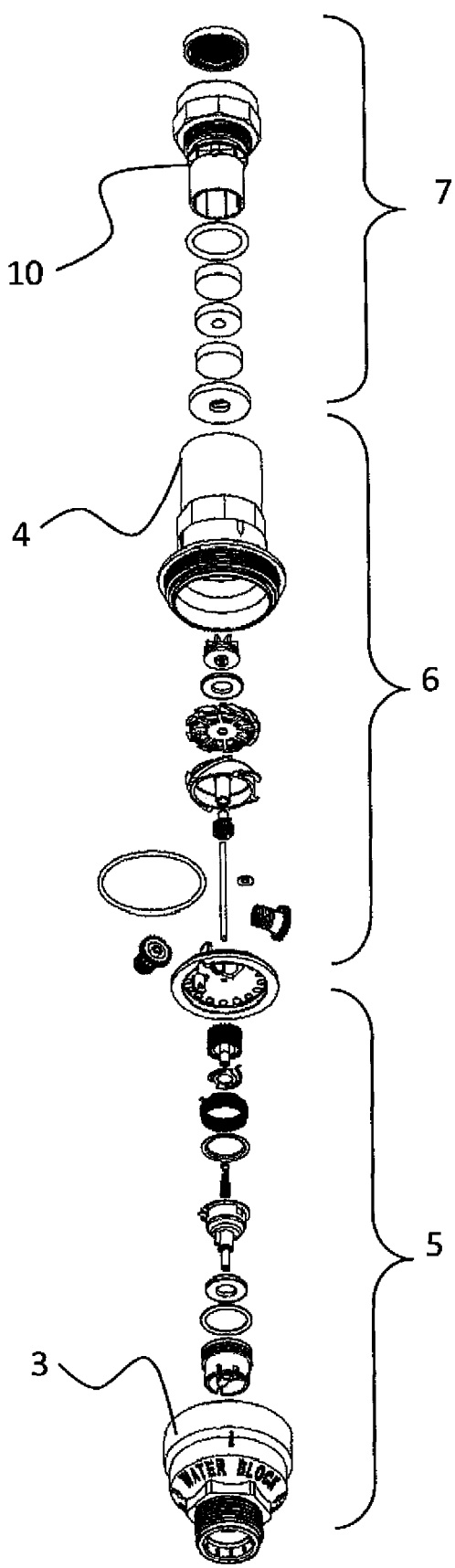
FIG. 4 is an exploded view of the device of the previous figures.
Figure 5:
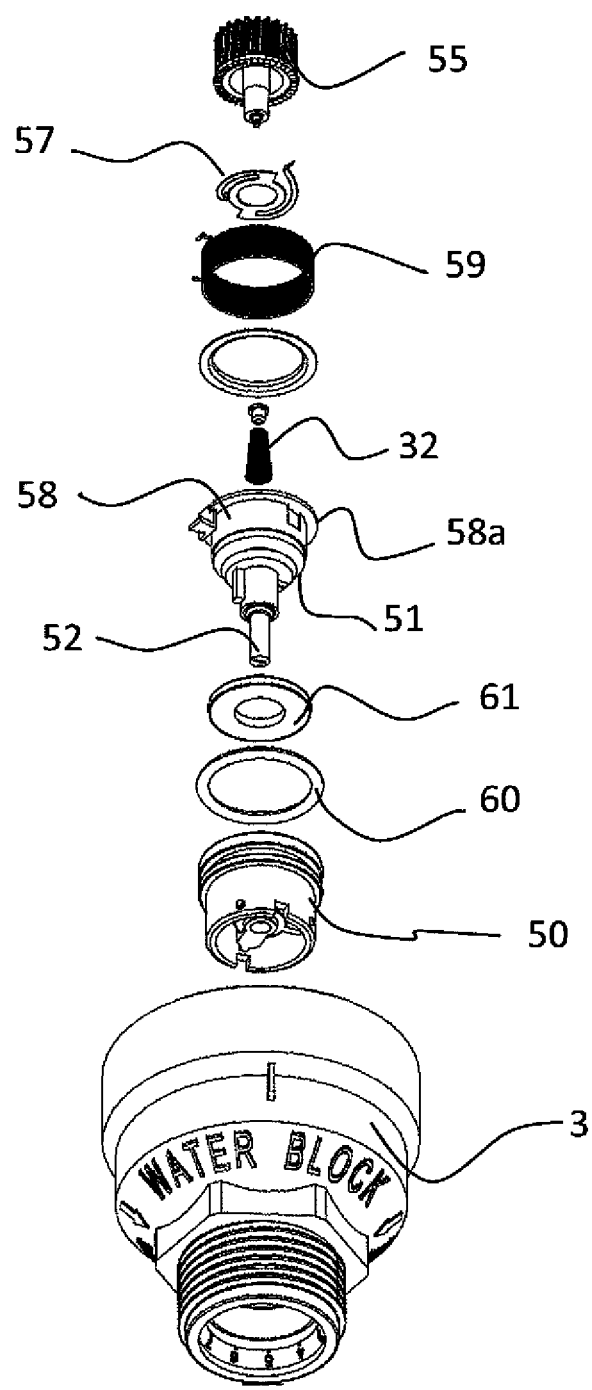
FIGS. 5, 6 and 7 show respective enlarged details of FIG. 4.
Figure 6:
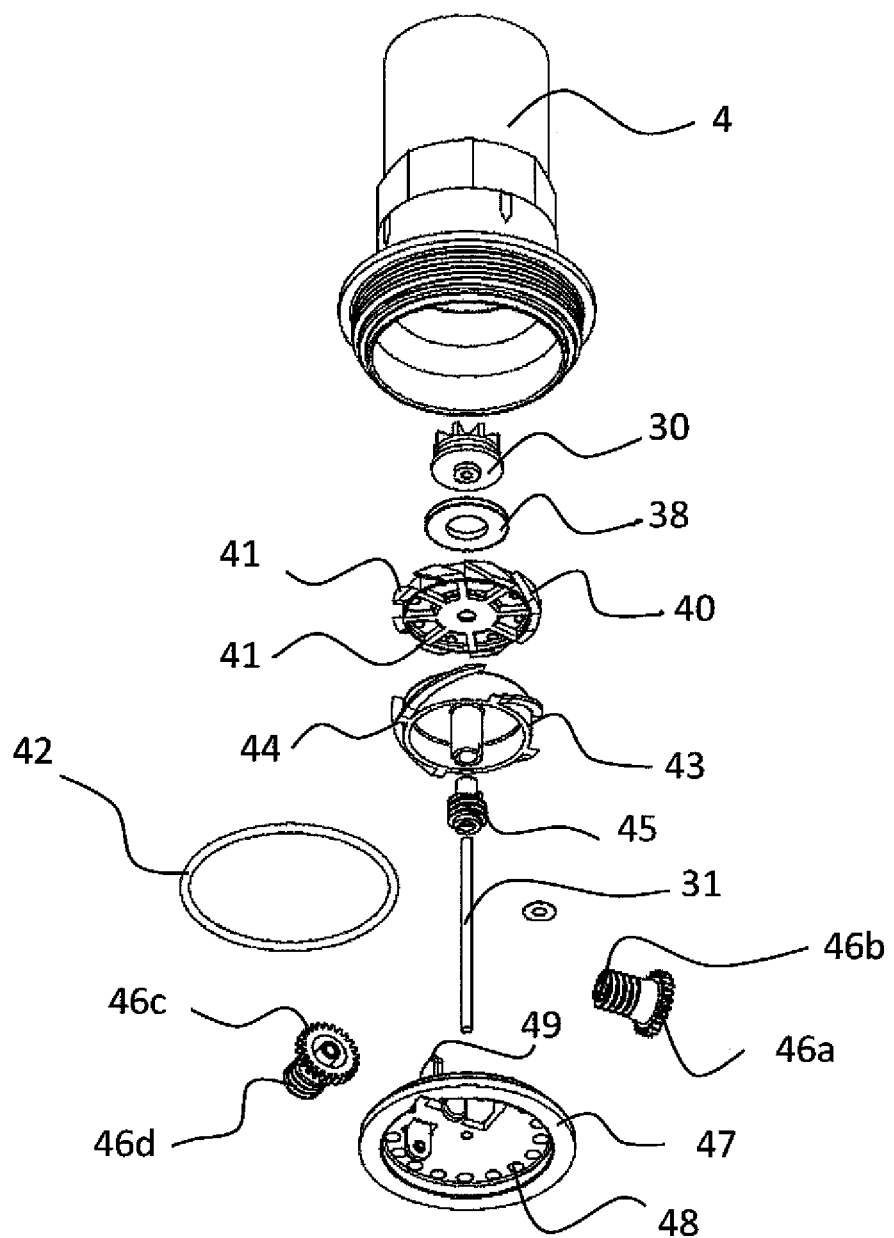
Figure 7:
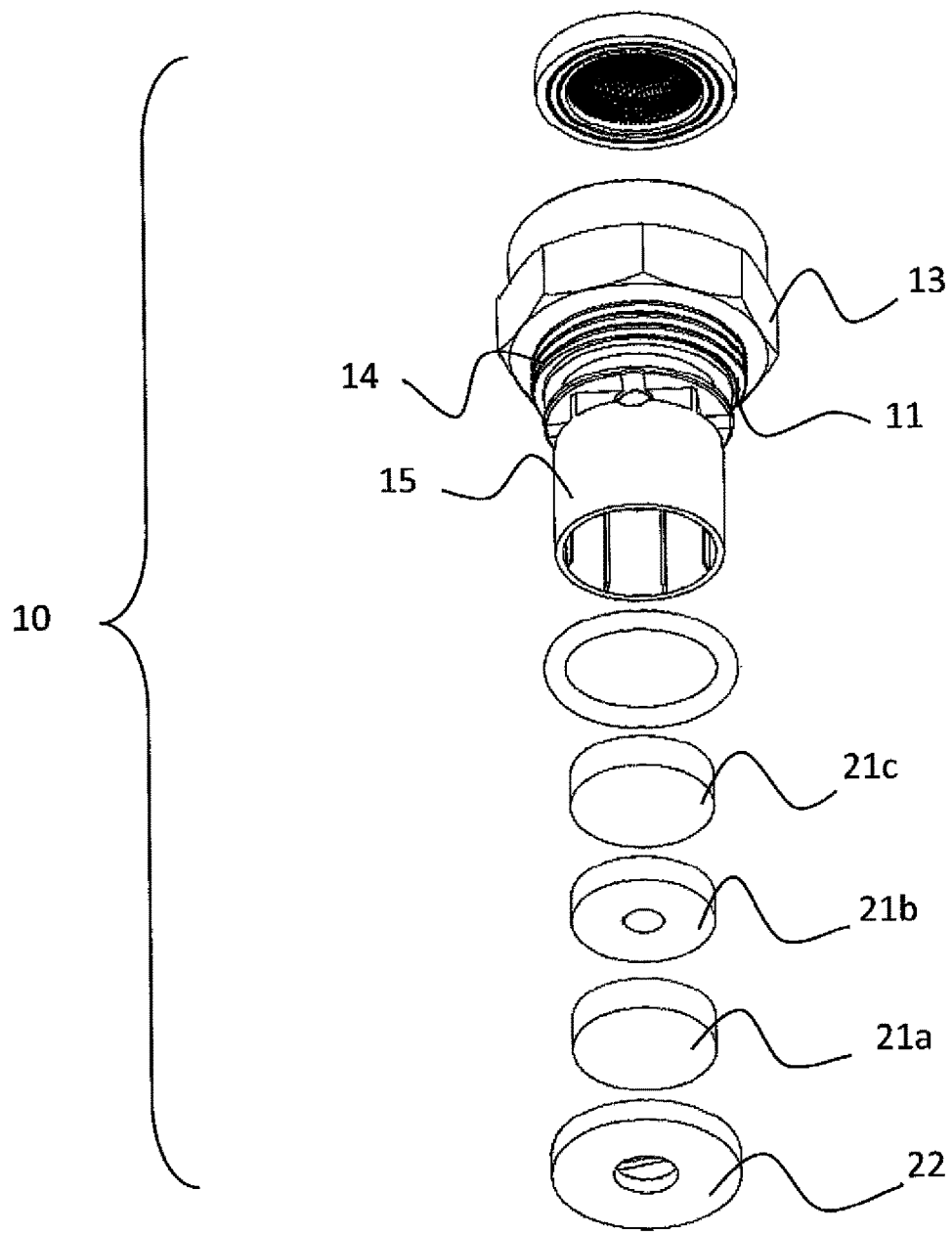
Figure 8B:
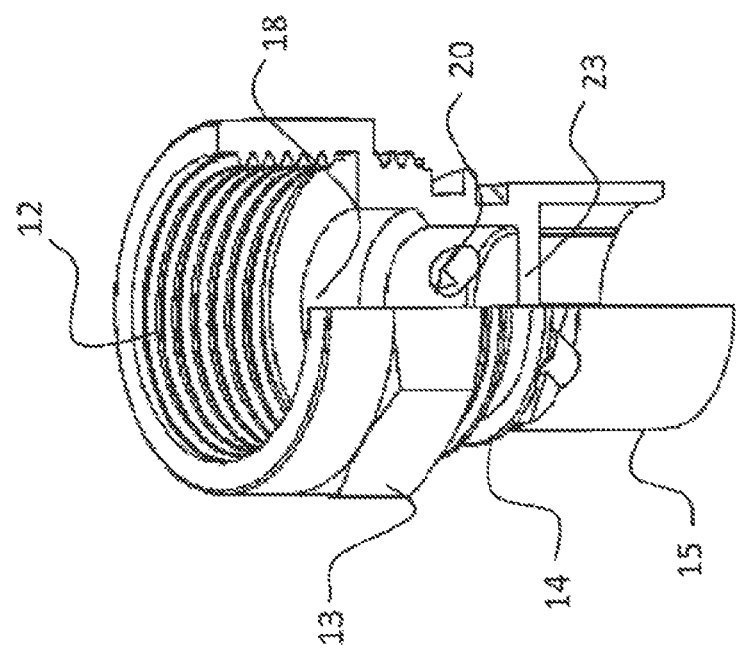
FIG. 8(a), 8(b) are respectively a section and an axonometric view of a first detail of the device of the previous figures.
Figure 8A:
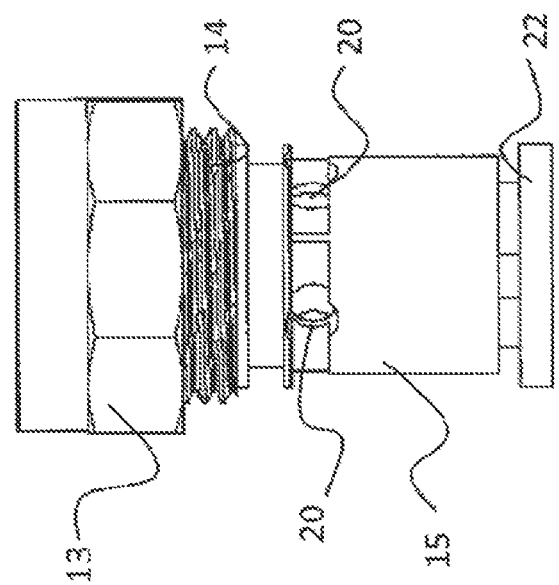
Figure 9B:
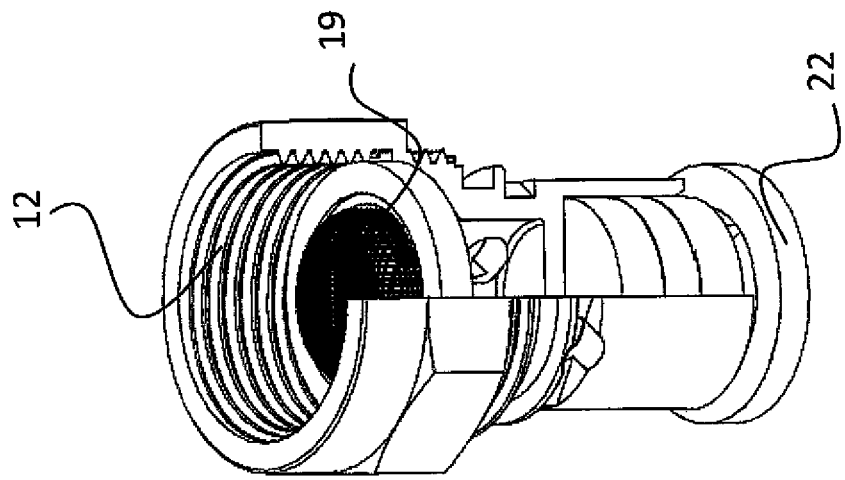
FIG. 9(a), 9(b) are respectively a section and an axonometric view of a second detail of the device of the previous figures.
Figure 9A:
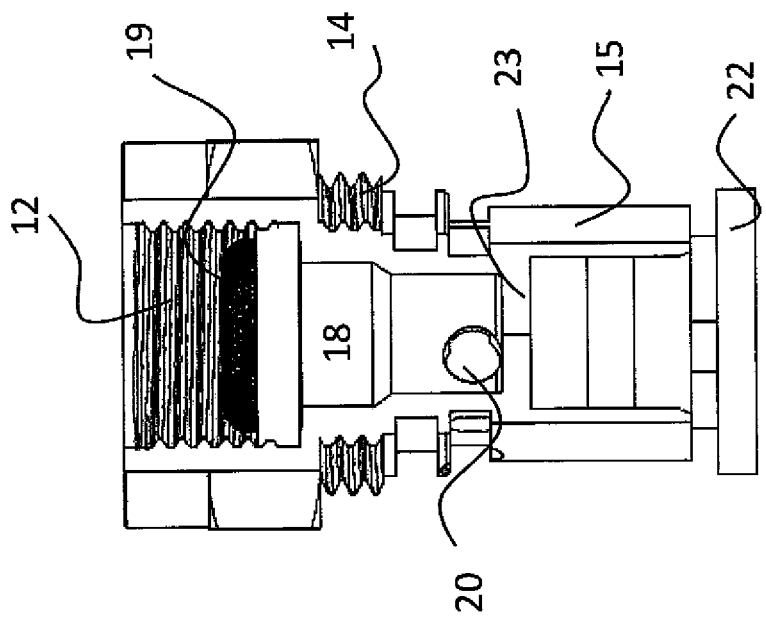
Figure 10A:
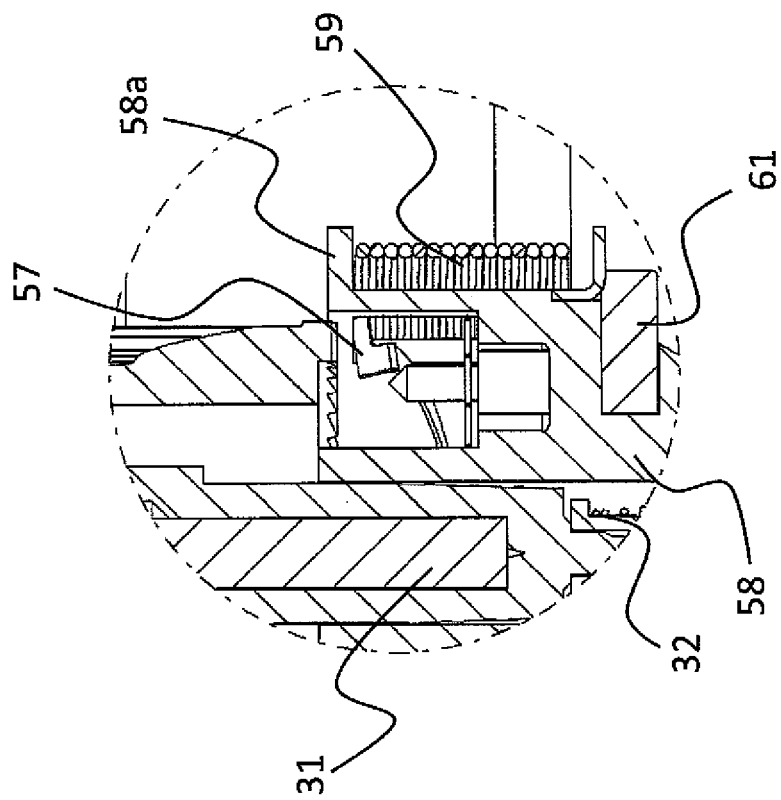
FIG. 10a is an enlargement of a detail of FIG. 10.
Figure 10:
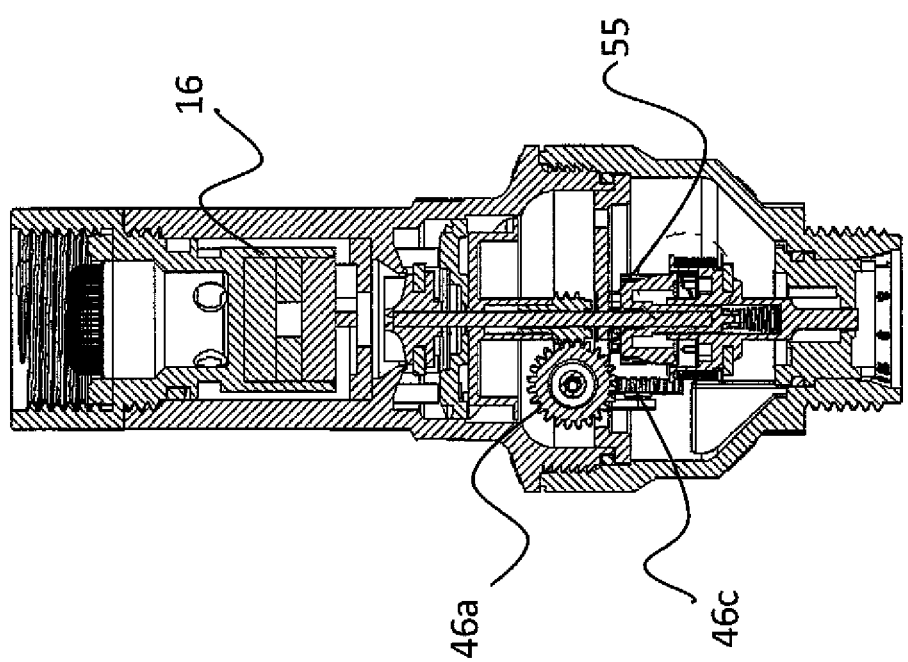
FIG. 10 is a dashed longitudinal section view of the device of the previous figures.
Figure 11B:
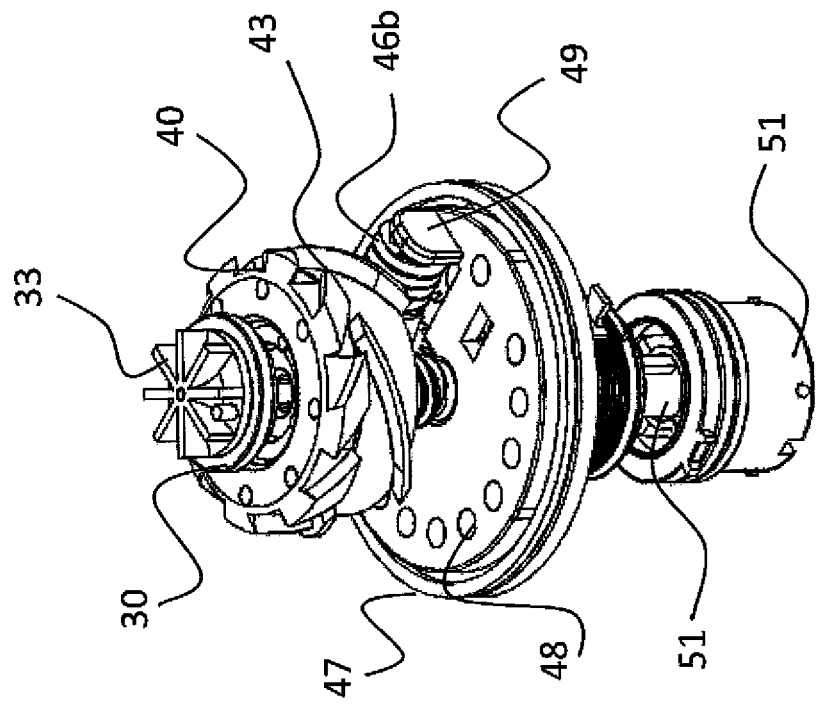
FIG. 11(a), 11(b) are respectively a front and an axonometric view of an additional detail of the device of the previous figures.
Figure 11A:
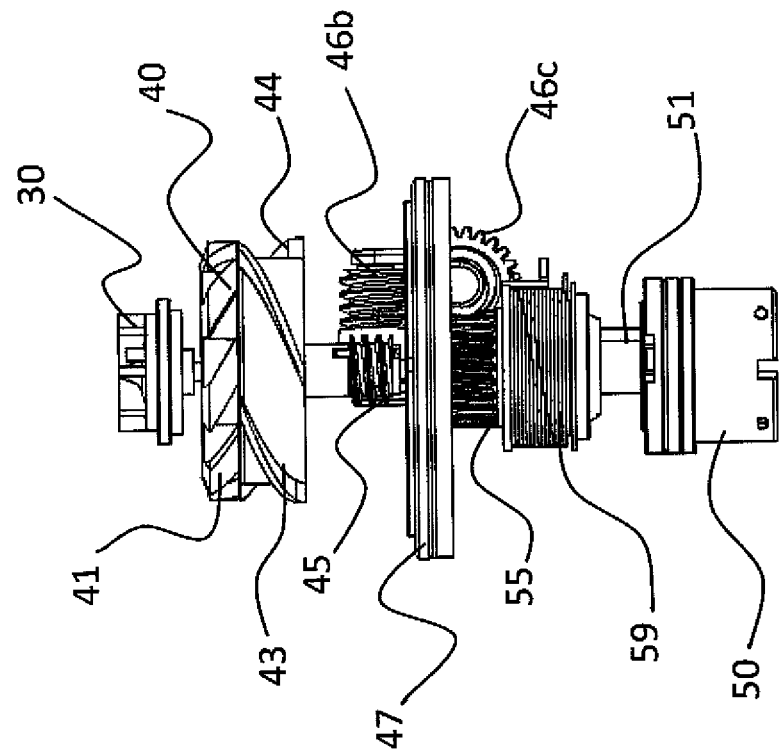

In addition to being able to rotate, the shaft 31 can translate axially as a result of the pressure exerted by the water that flows from above, as indicated by the arrow in FIG. 2; for this reason, in the upper part of the first shutter 30 there is provided a diverter 33 to deviate the flow of water, consisting of a series of blades in a sunburst arrangement that in the resting condition of the device shown in FIG. 3 (i.e., in the absence of thrust given by the flow of the water) is located at a higher level relative to a seat 35 for the passage of the water, with which abuts a sealing ring 38 of the first shutter 30.

Thereunder and in coaxial position with respect to the stem 31 of the device 1, there is a diffuser 40 mounted transversely to the upper half body 4; the diffuser 40 is provided with helical or inclined ribs or blades 41 whose purpose is to direct the flow of the water against the blades 44 of an impeller 43, mounted idle on the shaft 31 on which there is keyed a worm screw 45. Said blades 41 of the diffuser 40 are preferably inclined in an opposite direction compared to the blades 44 of the impeller 43.

The worm screw 45 is coupled with a reduction mechanism 46 which in this example is of the type with two stages, comprising respective pairs of gears 46a-46b, 46c-46d (FIGS. 6, 10, 11 and 12) with inclined axes and consisting of corresponding teeth and worm screws obtained at the end of bushings that are rotating or otherwise rotatably coupled on a diaphragm 47.

However, it should be stressed that the reduction mechanism 46 may have a different number of reduction stages, i.e., higher or lower than two, and there may be a different number and different types of gears: e.g., with axes that may be parallel and/or co-planar, simple and/or differential (e.g., planetary), bevel and/or cylindrical, with straight and/or helical teeth; this will essentially depend on external factors such as the torque and the rotational speed of the impeller 43, the dimensions of the device, the velocity of the flow of water that traverses it, etc.

Regardless of the configuration of the reduction mechanism 46, the body 2 of the safety device is divided transversely by a diaphragm 47 applied at the coupling thread 5 between the lower half body 3 and the upper one 4, on which is peripherally positioned a crown of holes 48; the seal between the half bodies 4 and 3 is assured by means of a ring gasket 42 ("O ring" type).

On the diaphragm 47 there are also provided supports 49 for the elements 46a-46d of the reducer gear 46 allowing their mutual engagement, whilst the water that passes through the holes 48 of the diaphragm is collected on the bottom of the lower half body 3 that for this purpose has a flared shape able to facilitate the flow of the water towards an outlet valve 50, positioned at the lower threaded end 7.

The valve 50 comprises a shutter 51 applied to the lower end of the shaft 31, provided with a head 52 guided axially within the valve 50; in the shutter 51 is positioned the contrasting spring 32 that pushes on the lower end of the shaft 31.

On the latter is mounted a mechanism for controlling the shutter 51, which comprises a pinion 55 that in the lowered condition of the shaft 31, i.e., when the water flows from above and pushes it downward, comes to grip a torsion spring 57 housed within the upper part 58 of the shutter 51, externally to which is applied a helical spring 59 that in normal conditions of operation of the device, is compressed between an upper flange 58a of the top part 58 of the shutter 51 and a washer 60 coupled with the valve 50.

The shutter 51 also comprises a sealing ring 61 intended to abut against the valve seat 62, when the shutter 51 shuts off the passage of the water.

In essence the control mechanism of the shutter 51 operates in such a way that the rotation of the gear 55 integral with the shaft 31 stresses the torsion spring 57 which is calibrated for a force limit corresponding to a pre-set number of revolutions of the shaft 31, beyond which it makes the helical spring 59 snap and thrust the shutter 51 downwards, shutting the valve seat 62.

The rotation of the shaft 31 is operated by the impeller 43 that in practice operates as a hydraulic turbine actuated by water, through the train of reducer gears 46a-46d coupled with the worm screw 45.

While from a general point of view the safety function performed by the device 1, i.e., that of blocking the flow of water in case of anomalies or malfunctions of the appliance to which it is associated, is obtained with the mechanical means described above, the device according to the invention is nonetheless able also to carry out other important functions that significantly enhance its performance.

In accordance with the example of embodiment of the invention considered herein, in the upper half-body 4 are housed water treating means 10, which in this case are of the anti-limestone and/or antimicrobial type but which, as shall be more readily apparent below, may be different and have other functions, alternative or addition to the anti-limestone and/or antimicrobial function.

Advantageously the anti-limestone function is preferably obtained exploiting a magnetic effect, because this allows to combine effectiveness in the treatment and simplicity of the safety device 1.

Magnetic fields interact with the mineral salts, of calcium, potassium or others, dissolved in the water, which originate deposits or scale such as limestone, i.e., calcium carbonate; for this purpose they prevent the formation of compounds such as calcite or the like, responsible for limestone deposits and/or scale, possibly promoting the formation of other compounds such as aragonite that are not deposited on the surfaces with which they come into contact, so they can be evacuated with the flow.

This makes it possible to prevent the formation of the scale that we are commonly used to see in the taps, the sinks and the pipes of our homes.

In the safety device 1 according to the invention, the water treating means 10 serve the purpose of eliminating or otherwise reducing the deposits and/or scale that are formed on the surfaces of the internal components described above, intended to determine the operation and/or the safety function of the device 1.

It is easy to understand how the flow of water that traverses the devices, comes in contact with the diffuser 40, the impeller 43, the reducer mechanism 46 and its gears 46a-46d, the shaft 31, the valve 50 with the shutter 51, the diaphragm 47 with the holes 48, the inner walls of the half-bodies 3 and 4 etc.; with time, it becomes nearly inevitable for limestone and/or biofilm or deposits of microbial origin to be deposited on the surface of these components, with the risk of compromising their proper operation and hence the reliability of the safety device 1.

The water treating means that in this example perform the anti-limestone and/or anti-microbial function, have at least the task of preventing these risk situations for the device 1, avoiding formation and/or deposits on or between said components; in particular avoiding at least one between a blockage of the gear or rotating shafts and/or seal losses due to deposits on gaskets or seal seats and/or obstruction or reduction of the passage in holes or conduits with reduced section and/or blockage of elastic elements or springs.

For this purpose the treating means are advantageously constructed in the form of an insert 10 that is applied in a sealed manner, preferably with a ring gasket 9, at the thread 8 of the upper half-body 4 of the device; this facilitates the maintenance or replacement of the treating means, which can be extracted from the device by simply unscrewing the insert 10 from the upper half-body 4 to clean them or replace them.

The insert 10 can then be considered as a cartridge or otherwise as a replacement element of the hydraulic safety device 1, in place of which can in any case also be applied other replacement elements, not necessarily magnetic of anti-limestone and/or antimicrobial.

Consider, for example, activated charcoal filters or tablets that release disinfectants, dyes or other substances over time.

The insert 10 has substantially cylindrical or tubular shape, comprising a hollow casing 11, internally provided with a first thread 12 able to be connected upstream with a tap or the fitting of a pipe, a tap or another junction element to the water distribution mains (not shown in the drawings), whilst externally to the casing there is a second thread 14 intended to be screwed with the thread 8 of the upper half-body 4.

Additionally, on the exterior of the insert 10 is present a faceted portion 13, preferably with polygonal profile, e.g., hexagonal, octagonal or other, for engagement with tightening tools such as spanners, pipe wrenches or the like.

Preferably, a torsion or tightening action exercised on the faceted portion 6 of the upper half-body 4 of the device, is transmitted to the casing 11 of the insert 10 and then to its thread 12, enabling said upstream connection to the fitting of a pipe or other junction of the water distribution hydraulic mains; similarly, the same occurs when acting on the faceted portion 13 of the insert 10.

Therefore, the threads 5, 12 and 14 are preferably mutually concordant to make it possible to obtain the aforementioned effect of screwing the insert 10 to an external junction or pipe of the hydraulic mains, as a result of the tightening of the upper half-body 4.

The casing 11 of the insert 10 comprises a seat or a hollow portion 15, such as a substantially tubular or cylindrical seat, which in the operating condition of the safety device 1 shown in the figures, is inserted from above into the upper half-body 4 in a pre-set relation of radial distance therefrom, thereby defining substantially an interspace 16 for the passage of the water fed to the device 1; preferably, the interspace 16 is positioned in proximity to or at least in part around the seat or hollow portion (15). It should be noted that the interspace thus configured is independent of the fact that the device comprises a removable insert.

As shown in the drawings, the hollow portion 15 can be configured substantially similar to a cylindrical bushing; however other forms are also possible for this part of the insert 10: for example, it could be constructed with a section that is polygonal, lobed or otherwise not with circular geometry, or with detached sectors like ribs and arranged in a circle.

The hollow portion 15 serves the purpose of housing at least part of the treating means 21 of the liquid that traverses the device 1, preferably of the anti-limestone and/or antimicrobial type.

Preferably, at least the casing 11 of the insert 10 comprises or mounts at least one antimicrobial element or material; in particular, at least part of the casing 11 of the insert 10 is constructed or moulded from an antimicrobial material, or the hollow portion 15 houses at least one active treatment core or element 21. Said antimicrobial material being preferably a polymer or a thermoplastic material comprising a substance or charge of antimicrobial material, preferably a charge or silver powder able to release Ag+ ions, or comprising proteins or nano-materials or comprising alloys with copper.

The water treating means 21 shall be better described below, inasmuch as for a better understanding of the device 1, it is best to focus first on the flow of water.

For this purpose, in the casing 11 is axially present a conduit or chamber or cavity 18 for the distribution of the liquid that is fed to the device 1 through the fitting 12; as stated above, the latter consists in this example of the thread 12 obtained at the upper end of the insert 10, but it can be made differently in any appropriate shape, it being only necessary that it allows water to enter into the safety device 1 once it is connected to the water distribution mains.

The distribution chamber 18 is provided with a filter 19 at the fluid inlet side, whilst at the opposite side it is delimited by a transverse wall or barrier 23, which separates it from the hollow portion 15 of the casing 11 of the insert 10; said filter 19, too, may comprise or be made or moulded from antimicrobial material.

In proximity to said transverse wall or barrier 23, the distribution chamber is provided with a series of holes or apertures 20 for the passage of the water, arranged in a substantially radial or angled direction relative to the axis of the insert 10.

Said apertures 20 are preferably at least two and yet more preferably three or four, in order to distribute the flow of water in the most uniform possible way along the circumference or perimeter of the interspace 16 and/or the walls of the treatment element.

For this purpose the applicant has surprisingly observed that the distribution of the liquid in the interspace 16 can facilitate the interaction with the water treating means 21, preferably positioned at least in part in the hollow portion 15 of the insert 11.

Said interspace 16 of the safety or control device 1, preferably located at least between the body 4 and the portion 15, determines a substantially laminar or thinner flow at the treating means or magnet 21, in particular in order to improve the treatment of all the fluid, e.g., considering that a closer proximity of the fluid to the treatment element or to the magnet determines a greater inflow or a more intense magnetic field and/or a better ionic exchange.

Moreover, a substantially laminar or thinner flow is preferably determined on at least one part of the surfaces of the casing 11, made of antimicrobial material or comprising parts made of antimicrobial material, thereby determining a good interaction and/or exchange between the ions of the antimicrobial material and most of the fluid, determining a treatment of most of the fluid or water; for example, a flow is determined in said interspace 16 between the body 4 and the portion 15 made of antimicrobial material and/or the transit is determined in a series of holes or openings 20 of antimicrobial material and/or the transit is determined along the inner walls of a conduit or chamber or cavity 18 made of antimicrobial material.

Advantageously the means for the anti-limestone treatment of the water are of the magnetic type; for this purpose, in the device 1 is present a magnetic field produced by an active core 21 of permanent magnets 21a, 21b, 21c housed within the hollow portion 15 of the casing of the insert 10; to maintain the elements 21a-21c stably housed in the hollow portion 15, it is possible to apply a closing bottom 22 at its end, which serves in fact as a stopper.

The water treatment means 21 comprise in combination with, or alternatively to the anti-limestone means constituted by the aforementioned permanent magnets, antibacterial and/or antimicrobial means to disinfect or even just to sanitise the water.

The antibacterial or antimicrobial means are constructed in any appropriate way, although they preferably comprise an active core with a plurality of elements 21a, 21b, 21c housed within the hollow portion 15 of the casing 11 of the insert 10, having antimicrobial activity.

For this reason, for the sake of simplicity in the figures and in this description the magnetic anti-limestone elements and the antibacterial/antimicrobial elements shall be indicated with the same reference numbers (i.e., 21*a*, 21*b*, 21*c*) and what shall be stated for the ones may be extended, mutatis mutandis, to the others, and vice versa.

The antibacterial elements may be constructed in the form of cartridges or tablets, which release active principles, substances or compounds, e.g., those based on chlorine and/or iodine and/or potassium.

According to a preferred form of the invention, the dimensions of the active magnetic and/or antimicrobial core 21 within the hollow portion 15 are variable according to various parameters, such as the flow rate of the water expected for the device, the degree of hardness or the concentration of limestone, the dimensions of the safety device 1, the intensity of the magnetic field of the core 21.

For this purpose, the latter consists of a series of elements such as permanent magnets, cartridges or tablets 21*a*, 21*b*, 21*c*, stacked together in such a way as to reach a pre-set height according to the desired anti-limestone and/or antimicrobial effect; for this reason, the permanent magnets 21*a*-21*c* are configured as tablets or disks that can easily be superposed over one another to form the stack of the core 21.

In the circumstance it should nonetheless be pointed out that the configuration of the magnetic core 21 and of the elements that compose it may be different from what has just been explained: this derives from an advantageous aspect achieved by the particular embodiment of the invention shown in the drawings, with an active core comprising a plurality of elements 21*a*-21*c* that can be assembled so that it can easily be adapted to the different applications.

It is well known that that water quality may differ considerably from one location to another, e.g., from neighbourhood to neighbourhood or from city to city, but also from one year to the other and so on; therefore, in these conditions the concentration of limestone (the "hardness" of the water) varies from time to time and it is therefore desirable to be able to adapt the water treatment means to the different waters, in order to obtain an optimal anti-limestone effect.

In the hydraulic device 1 of the invention, this is easily obtainable by changing the number and/or the type of elements 21*a*-21*c* that form the core 21.

For example, not all elements 21*a*-21*c* need be permanent magnets; there may in fact be cases in which one or more of them has ferromagnetic, diamagnetic, paramagnetic or even non-magnetic properties.

The combination of elements 21*a*-21*c* with different properties and/or number and/or direction of the magnetic poles makes it possible to adapt the resulting magnetic field to the shape and to the flow of water that traverses the device 1.

To make one or more of the elements 21*a*-21*c* of the magnetic core 21, permanent magnets adapted to remain in contact with water can be used; therefore they can be made with ferromagnetic materials, e.g., ferrite, rare earths, neodymium-iron-boron and the like, possibly coating them with protective or water-proofing materials, such as an appropriate polymer or a resin or a thermoplastic material, possibly by over-moulding a body part of the device 1, such as said body 11.

Regardless of the materials used for its construction, the magnetic core 21 provides a magnetic flow that interacts with water, preferably at the distribution head 18 and/or at the interspace 16, in order to perform a treatment or anti-limestone action on the water.

For this reason, dimensions like the length of the core 21, its width, the arrangement and the number of elements 21*a*-21*c* that comprise it, are important parameters on which it is possible to act to obtain the desired result.

They influence the flux lines of the magnetic field, maximising it at predefined points of the path of the water.

Thus, for example, the magnetic core is oriented with N-S polarity as shown in FIG. 2, and the magnetic flux is therefore greatest along this direction, involving the water that is at the N-S poles of the core, i.e., between the distribution head 18 and the core 21 and between the latter and the head of the shutter 30, preferably with flux lines that extend between the N-S poles passing in the flow that transits along the interspace 16.

preferably, the body parts of the device 1 located at the magnetic core 21 are made of a polymer or plastic, in particular in order not to shield or attenuate the magnetic field, however magnetic parts or inserts or yokes may be provided, able to convey the magnetic field in predefined points where the fluid transits, e.g., to concentrate it in these points for a more effective treatment.

In this context it is also necessary to point out that according to a possible embodiment of the invention, the upper half-body 4 or only one part therefor can be made of metallic material, in order to concentrate the magnetic flux in proximity to the interspace 16, thereby improving the anti-limestone effect on the water in this region.

Alternatively, the upper half-body 4 could integrate at least in part the permanent magnets and/or the elements able to treat the fluid; e.g., permanent magnets over-moulded from the material of the body of the device 1, such as the material of the upper body 4, preferably injecting a polymer or a thermoplastic or thermosetting material on at least one magnetic or ferromagnetic element.

As will be readily apparent farther on, this solution is advantageously applied to an embodiment variant of the device 1 that will be described below.

Advantageously, the magnetic or ferromagnetic elements may be moulded, preferably as an integral part or as an added part of the device 1, e.g., made of plasto-ferrite or of a polymer or of a thermoplastic material with added charges or metallic powders or other substances suitable for the purpose, preferably magnetised after moulding.

From the above description, the operation of the hydraulic device 1 according to the operation can be understood.

With regard to safety against flooding, i.e., blocking the water in case of malfunction of an apparatus or appliance to which the device is associated, a distinction must be made between the ordinary operating condition and a failure condition.

For the former, when there is an ordinary request for water by the appliance, as in the case of washing or rinsing the load, be it laundry in the case of a washing machine or dishes and utensils for a dishwasher, a pre-determined quantity of water flows into the device 1; said quantity will be smaller than the safety limit set on the device itself (e.g., 20, 30, 40 litres or another quantity).

In this condition, the water enters the body 2 from above and passes through the insert 10 where it undergoes the treatment or anti-limestone and/or antimicrobial action of the means or elements 21 and/or other element suitable for the inventive purpose, to continue towards the lower half-body 3 where its pressure presses on the head of the first shutter 30, lowering it integrally with the shaft 31 and overcoming the elastic force of contrast of the spring 32.

In this condition, the gear 55 keyed on the shaft 31 engages the torsion spring 57, which is loaded according to the number of turns effected by the shaft set in rotation by the impeller 43 and by the train of reduction gears that connects it to the worm screw 45.

Once the stage of feeding the water into the appliance is completed, the appliance stops requesting water from the mains and hence the flow of water is stopped; in this condition, the spring 32 thrusts the shaft 31 upwards, so that the gear 55 disengages from the torsion spring 57 and the sealing ring 38 of the first shutter 30 closes the seat 35 for the passage of the water towards the lower half-body 3.

This cycle is repeated in case of regular operation of the appliance; when the latter instead has a failure, or for any other reason the flow of the water that traverses the device 1 reaches the pre-set safety limit, the rotation of the gear 55 completes such a number of turns as to overcome the resistance of the torsion spring 57, thereby tripping the helical spring 59 actuating the shutter 51 of the valve 50.

The valve 50 closes the outlet of the safety device 1, thus preventing the outflow of the water, until the ordinary condition of operation is restored; for this purpose, the device 1 is armed unlocking the valve 50 with the tip of a tool such as a screwdriver or the like.

In addition to the water cut-off function, just considered, the device 1 also performs a treatment function, in particular through the insert 10 mounted in the upper half-body 4.

This dual function generates a synergic effect when, as in the case considered above, the treatment action is carried out upstream and/or in proximity to the control and/or flow limiter means, i.e., the means for cutting off the flow of water in case of malfunction of the appliance downstream of the device 1.

As has been more thoroughly explained above, the magnetic fields can interact with the calcium carbonate particles present in the water in the form of ions, salts or other compounds, giving rise to a separation, that promotes its subsequent removal or evacuation from the appliance, avoiding precipitation and/or combination with other elements that could form scale or deposits; moreover, the antimicrobial ions released by the treatment elements can prevent the formation of colonies or aggregations of microorganisms and the deposit of biological substances or "biofilms".

The water treatment means 21, such as said magnetic core and/or the antimicrobial elements, being positioned upstream or in proximity to all the mechanical components of the hydraulic safety device 1 provided to cut off and/or limit the flow, remove and/or reduce or otherwise contrast the deposit of limestone or biological substances on at least one among the surfaces of the diffusers 40, of the impeller 43, of the screws 45 and of the reduction gears 46a-46d, the shutters 30 and 51, the springs 32, 57 and 59, the diaphragm 47 with the holes 48 and all the other parts that come in contact with the water.

This prevents the formation of scale and deposits on said surfaces, which can compromise the regular operation of the safety device 1: the latter is thus highly effective and reliable in operation, even for long periods of time.

It should be noted that the safety device 1 achieves this objective in a simple manner, because it does not require any addition of chemical substances or electrical power as instead occurs in some systems provided in appliances (see the description in Spanish application No. 2 282 016).

In addition, the preferential embodiment of the device with an easily removable insert 10 in which is positioned the magnetic core 21, facilitates the maintenance and/or replacement of the device 1 thus making it reliable and with regular performance.

It should be considered that in the long run the filter 19 and/or the interspace 16 and/or the distribution chamber 18 can be clogged, thus needing to be cleaned or replaced; for this purpose, it is sufficient to unscrew the insert 10 from the body 2 of the device and to replace it with a new one.

Regarding the part of the device 1 that performs the safety or anti-flooding function, the configuration configured herein is advantageous because it synergistically co-operates with the part relating to the treatment or anti-limestone or antimicrobial function, being preferably positioned in proximity or one upstream of the other along the direction of advance of the flow of water in the device.

In other words, by performing the treatment or anti-limestone or antimicrobial function in proximity or upstream of the mechanical components tasked with limiting the flow, the formation on such components of deposits that can compromise their regular operation is prevented and/or intrinsically limited.

It should also be stressed that the water treatment means in the hydraulic safety device, which are preferably anti-limestone and/or antimicrobial but, as will be described better below, may also be of another nature, operate on the entire flow of water which is then fed to the apparatus or appliance: in fact, all the water necessarily traverses the device and is thus treated.

On the contrary, in the prior art the tablets or the powders or other similar anti-limestone products are dispensed directly inside the appliance, where therefore the flow of water is dispersed in the tank and hence it may occur that not all water is treated or is treated uniformly.

The safety device 1 is then compact and has little bulk, since the treatment and control or safety functions are incorporated in the same device 1 and/or casing 2, which in fact is little larger than a simple control or safety or anti-flooding device.

Industrial production costs are also low, since it is possible to add and/or replace only some of the parts according to the invention in the control and/or safety devices that are already available on the market.

Naturally, variants of the invention with respect to the description provided so far are possible.

Figure 12:
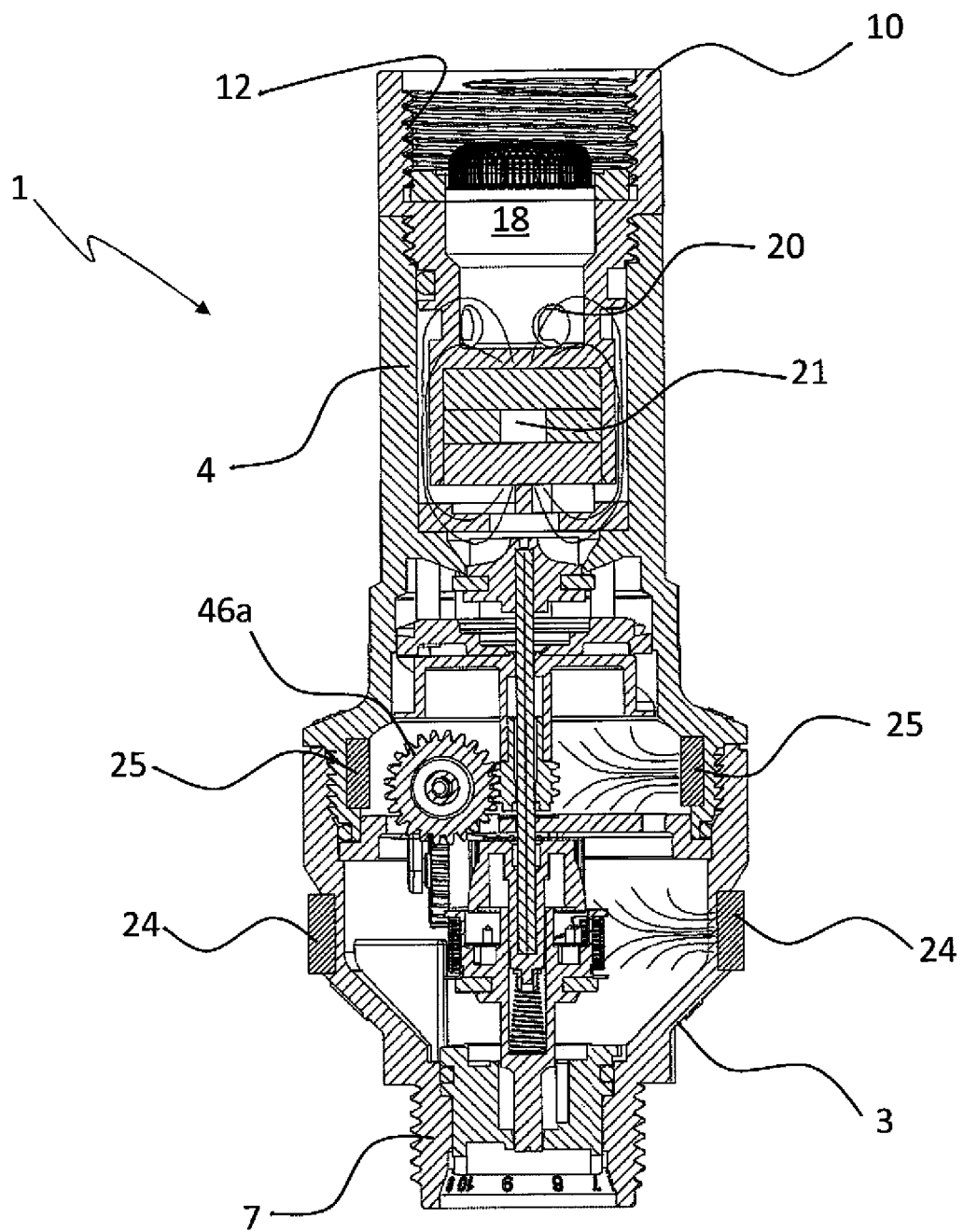
FIG. 12 is a dashed longitudinal section view of a variant of the device of the previous figures.

It is readily apparent that within this teaching those skilled in the art will be able to devise several equivalent solutions; by way of indication, the shutter 30 with the shaft 31 and the reducer mechanism, as well as the cut-off valve 50 and the snap activation system with the springs 57, 59, may be replaced with other components Aside from the mechanical viewpoint as seen above, other variants of the device of the invention are possible in relation to its anti-limestone and/or antimicrobial functions; one of these is shown in FIG. 12, where the elements that are structurally or functionally equivalent to those already seen previously are indicated with the same reference numbers.

As can be seen, in this case the water treatment means comprise, in addition to the anti-limestone and/or antimicrobial means 21 housed in the insert 10, also further treatment or anti-limestone and/or antimicrobial elements 24, 25, positioned at the mechanisms that in the device 1 are intended to limit and control the flow; in the non-limiting example of FIG. 12 both treatment elements 24 and 25 are shown as magnetic anti-limestone elements, however at least one of the treatment elements 24, 25 can be of the antimicrobial type, or an anti-limestone 24 and an antimicrobial element 25 can be provided, or additional treatment elements with said anti-limestone and/or antimicrobial functions (not shown) can be provided in the body 2.

As seen from FIG. 12, the treatment elements can be housed within the body 2 of the device 1, as in the case of the element 25 which is applied internally to the upper half-body 4 at the reducer gear 46, or externally as in the case of the element 24 that is applied on the lower half-body 3 at the height of the valve 5 and of the shutter 51.

The magnetic anti-limestone elements 24, 25 can have toroidal shape, i.e., consisting of a single ring made of magnetic material (e.g., ferrite, magnetite), or they can be made with a plurality of individual magnets positioned close to each other along the circumference of the half-bodies 3 and 4.

Irrespectively of the embodiment, the treatment elements 24, 25 can be applied to the body 2 of the device or to the half-bodies 3, 4, in any appropriate way; therefore, they can be fixed by gluing with resins or other appropriate water-resistant adhesives, but also by moulding and over-moulding.

The polarities of the magnets 24 and 25 are selected in such a way as to promote the progress of the magnetic flux lines towards the components (reducer 46, valve 50, shutter 51 and others), to prevent the formation of limestone deposits on them (in FIG. 12, the flux lines are visible).

This variant of the invention advantageously lends itself to being combined with the use of antimicrobial elements 21*a*, 21*b*, 21*c* in the insert 10: it is evident that applying magnetic anti-limestone elements 24, 25 in the half-bodies 3 and 4, the space within the casing 11 of the insert 10 can advantageously be exploited for other functions, such as the antimicrobial, filtering, sanitising function, etc.

This can then give rise to a synergic effect, since the device of the invention is able not only to improve its reliability as controller and/or limiter of the flow and/or of the quantity of water, preventing the formation of deposit or limestone on the mechanical components in its interior, but also to sanitise, cleanse or otherwise improve the quality of the water that is sent to the user apparatus to which it is associated, be it an appliance, a heating, irrigation or other system.

According to a further autonomously inventive aspect of the device 1 of the invention, it incorporates, in addition to the flow control and/or anti-flooding safety function, at least also another function of utility for the appliance, e.g., the function of disinfecting or demineralising the water, with means such as activated charcoal filters or tablets that release active substances (e.g., disinfectants) over time.

As mentioned above, instead of the magnetic core 21 or also in combination therewith, it is possible to provide tablets, powders and the like, which release substances capable of disinfecting the water from micro-organisms, such as chlorine, iodine and compounds thereof.

Similar considerations can also be made for the filtration of water with activated charcoal, which could also perform the anti-limestone and/or antimicrobial function; in this case, instead of, or in combination with, the magnetic core 21, tablets, granules or particles of activated charcoals could be provided: the water would then not be made to flow out into the interspace 16 but rather within the bushing 15 which would then be communicating with the distribution chamber 18.

It is easy to understand that for all these applications, the presence of the insert 10 is advantageous, since therein, instead of one or more magnetic elements 21*a*-21*c* or also in combination with one or more thereof, it is possible to insert a different treatment element, such as a treatment tablet (obviously, of appropriate dimensions) or a filtering cartridge with activated charcoal.

According to at least one of the variants of the invention, the hollow portion 15 may be modified with respect to the one shown in the figures, thus causing the tablets and/or cartridges present in its interior to be able to be lapped by the water that passes in the interspace 16.

For this purpose, the wall of the hollow portion 15 can be constructed with the detached sectors or ribs as explained above, or it may present holes or apertures (obviously of appropriate dimensions and/or number) through which the water can come in contact with the tablets or cartridges housed in the hollow portion.

Irrespective of the different embodiments, it should be observed that the insert 10 with the casing 11, preferably provided with a hollow portion 15, houses the water treatment elements, be they magnetic, tablets or filtering cartridges or antimicrobial elements, in particular protecting them against the erosion and/or corrosion due to water and to the substances or particles dispersed therein.

According to at least one autonomously inventive aspect, at least one among the components of the control or safety device comprises elements or parts made or moulded from magnetic or antimicrobial material; in particular, at least one among the first shutter 30, a spring 32, 57, 59, a shaft 31, a flow diverter 33, a diffuser 40, an impeller 43, a worm screw 45, gears 46, 55, a diaphragm 47, an outlet valve 50 and/or a shutter 51, a pinion 55, a washer 60 is an anti-limestone or antimicrobial treatment element.

All these variants and/or the characteristics described therein are nonetheless included within the scope of the claims that follow.

The invention claimed is:

1. A control or safety device for hydraulic apparatuses or systems, said device comprising:
    a body in which there is a water path extending between an inlet or an inlet fitting and an outlet or an outlet fitting;
    a water control and/or shut-off means arranged between said inlet or inlet fitting and said outlet or outlet fitting, the water control and/or shut-off means being adapted to count a flow of water and to block the flow of water flowing through the body in an event of a fault of the hydraulic apparatuses or systems or when a pre-set amount of the water has been supplied;
    an insert disposed within the body; and
    water treating parts that are active along said water path, the water treating parts comprising one or more permanent magnets that are inserted into the insert and that operate to prevent limestone formation on the water control and/or shut-off means, and
    wherein said water treating parts are located upstream and/or in a proximity of the water control and/or shut-off means.

2. The device according to claim 1, wherein at least a part of the water treating parts is associated and/or integrated with the body and/or with a part of the water control and/or shut-off means.

3. The device according to claim 1, wherein a portion of the water treating parts is moulded or is made of polymer or plastic material charged with a charge.

4. The device according to claim 3, wherein the charge is a ferromagnetic charge and/or an anti-microbial charge.

5. The device according to claim 1, wherein the water treating parts are arranged in connection with the water control and/or shut-off means.

6. The device according to claim 1, comprising:
the insert, which is adapted to define a seat or a hollow portion for housing the water treating parts, and
wherein an interspace is arranged around the hollow portion in which the water flows, the interspace being in fluidic communication with a passage seat towards the water control and/or shut-off means.

7. The device according to claim 6, wherein the insert comprises a distribution chamber or cavity and/or holes or apertures for distributing the water flow in a substantially uniform manner into the interspace.

8. The device according to claim 6, wherein the interspace determines a substantially laminar or thinner flow at the water treating parts.

9. The device according to claim 8, wherein the water treating parts comprise an active core comprising a plurality of treating elements.

10. The device according to claim 1, wherein the water treating parts comprise an active core comprising a plurality of treating elements.

11. The device according to claim 10, wherein the plurality of treating elements include magnetic or anti-limestone treating elements and anti-microbial treating elements.

12. The device according to claim 1, wherein the body or a part thereof comprises or is associated with magnetic or ferromagnetic material, cooperating with a magnetic treating core or means provided in the insert to concentrate a magnetic flux in predefined water passage areas.

13. The device according to claim 1, wherein the water treating parts comprise tablets and/or cartridges comprising disinfectant or filtering substances.

14. The device according to claim 1, wherein the insert houses the water treating parts and is provided with fitting means for connecting to a tap and/or to a pipe and/or to one or more water mains,
wherein the insert is coupled to the body, and
wherein at least one of the insert and the body is provided with engaging means for a fastening tool, for a purpose of coupling the device to said tap and/or pipe and/or one or more water mains.

15. The device according to claim 1, wherein the insert includes a casing comprising a hollow portion that receives the water fed to the device, and
wherein the casing, when inserted with the insert into the body, forms an interspace for the water to flow between the casing and an upper half-body of the body, the casing being provided with a plurality of apertures for passage of the water from the hollow portion of the casing outwardly towards the interspace, each aperture included in the plurality of apertures being arranged in a substantially radial direction relative to an axis of the insert such that the water is distributed along a perimeter of the interspace.

16. The device according to claim 1, wherein the water treating parts further comprise an anti-microbial treating means of a type in which ions and/or ionic substances are released into the water flow.

17. The device according to claim 1, wherein at least part of the water treating parts is associable with and/or removable from the body or applied to the body at the inlet.

18. The device of claim 1, wherein the insert comprises a casing having a hollow portion and a closing bottom applied to an end portion of the casing to close off the hollow portion and stably house the one or more permanent magnets that are disposed within the hollow portion of the casing.

19. The device of claim 18, wherein the water path extends around an outer periphery of the casing which houses the one or more permanent magnets.

20. The device of claim 18, wherein the casing forms only a part, but not an entirety, of a length of the insert such that the water path extends through a different part of the insert prior to reaching the casing.

21. The device of claim 1, wherein:
the body comprises a lower half-body and an upper half-body,
the water control and/or shut-off means is disposed within the lower half-body, and
the insert is removably disposed within the upper half-body of the body.

22. A control and/or treatment device for hydraulic apparatuses or systems, said device comprising:
a body in which there is a water path extending between an inlet and an outlet;
a water control and/or shut-off means arranged between said inlet and said outlet, said water control and/or shut-off means being adapted to count a flow of water when passing through the water path;
an insert disposed within the body; and
anti-microbial treating means at least partly made of a polymer or thermoplastic material or of a polymer or thermoplastic material charged with treating substances,
an anti-limestone treating means comprising one or more permanent magnets that are disposed within the insert and that operate to prevent limestone formation on the water control and/or shut-off means,
wherein the anti-microbial treating means comprises at least one silver-based substance or charge adapted to release Ag+ ions, or comprises proteins or nanomaterials or copper alloys,
wherein the anti-microbial treating means releases ions and/or ionic substances into a flow of water when the flow of water is flowing through the body,
wherein an interspace of the body is structured to cause at least a part of a flow of water to flow in a substantially laminar manner when flowing through the body,
wherein said anti-microbial treating means and said anti-limestone treating means are located upstream and/or in a proximity of the water control and/or shut-off means.

23. The device according to claim 22, wherein the insert includes a casing comprising a hollow portion that receives water fed to the device, and
wherein the casing, when inserted with the insert into the body, forms the interspace for water to flow between the casing and an upper half-body of the body, the casing being provided with a plurality of apertures for passage of water from the hollow portion of the casing outwardly towards the interspace, each aperture included in the plurality of apertures being arranged in a substantially radial direction relative to an axis of the insert such that water is distributed along a perimeter of the interspace.

24. The device according to claim 23, wherein the plurality of apertures includes at least 4 apertures.

25. The device according to claim 23, wherein the plurality of apertures includes at least 2 apertures.

26. The device according to claim 22, wherein at least a part of the anti-microbial treating means is associated and/or integrated with the body and/or with a part of the water control and/or shut-off means.

27. The device of claim 22, wherein the anti-microbial treating means and/or the anti-limestone treating means are positioned upstream or in proximity to all other components of the device provided to cut off and/or limit the flow, remove and/or reduce or otherwise contrast a deposit of limestone or biological substances on at least one among the surfaces of a diffuser, an impeller, screws, reduction gears, shutters, springs, a diaphragm with holes and all the other parts that come in contact with the water.

28. The device according to claim 22, wherein the antimicrobial treating means comprising the at least one silver-based substance or charge adapted to release Ag+ ions.

29. A control or safety device for hydraulic apparatuses or systems, the device comprising:
- a body in which there is a water path extending between an inlet or an inlet fitting and an outlet or an outlet fitting;
- a water control and/or shut-off means arranged between the inlet or inlet fitting and the outlet or outlet fitting, the water control and/or shut-off means being adapted to count a flow of water and to block the flow of water flowing through the body in an event of a fault of the hydraulic apparatuses or systems or when a pre-set amount of the water has been supplied;
- an insert disposed within the body; and
- water treating parts that are active along the water path, the water treating parts comprising one or more water cleansing antimicrobial units that are arranged within the insert and that operate to cleanse the water prior to the water reaching the water control and/or shut-off means, which is positioned downstream of the water treating parts,
- wherein the water treating parts are located upstream and/or in a proximity of the water control and/or shut-off means.

* * * * *